United States Patent
Athlur et al.

(10) Patent No.: US 10,863,526 B2
(45) Date of Patent: Dec. 8, 2020

(54) SYSTEM AND METHOD FOR PRIORITIZING DATA TRAFFIC

(71) Applicant: Citrix Systems, Inc., Burlington, MA (US)

(72) Inventors: Anudeep Narasimhaprasad Athlur, Bangalore (IN); Praveen Raja Dhanabalan, Bangalore (IN); Nandikotkur Achyuth, Bangalore (IN)

(73) Assignee: Citrix Systems, Inc., Burlington, MA (US)

( * ) Notice: Subject to any disclaimer, the term of this patent is extended or adjusted under 35 U.S.C. 154(b) by 41 days.

(21) Appl. No.: 16/399,423

(22) Filed: Apr. 30, 2019

(65) Prior Publication Data
US 2020/0351902 A1 Nov. 5, 2020

(51) Int. Cl.
*H04W 72/10* (2009.01)
*G06F 3/0486* (2013.01)
*H04W 4/02* (2018.01)
*H04W 4/029* (2018.01)

(52) U.S. Cl.
CPC .......... *H04W 72/10* (2013.01); *G06F 3/0486* (2013.01); *H04W 4/027* (2013.01); *H04W 4/029* (2018.02)

(58) Field of Classification Search
CPC ...... H04W 72/10; H04W 4/027; H04W 4/029
See application file for complete search history.

(56) References Cited

U.S. PATENT DOCUMENTS

| 2014/0244144 A1* | 8/2014 | You | G08G 1/22 |
| | | | 701/117 |
| 2015/0035685 A1* | 2/2015 | Strickland | B60Q 1/525 |
| | | | 340/901 |
| 2018/0077539 A1* | 3/2018 | Yoneda | H04W 4/06 |

* cited by examiner

*Primary Examiner* — Brenda H Pham
(74) *Attorney, Agent, or Firm* — Michael T. Abramson; Holland & Knight LLP (57) ABSTRACT

Described embodiments provide a method, computer program product, and computer system for identifying a first geo-location of a user. A first object associated with a second geo-location may be identified. An estimated travel time of the user between the first geo-location and the second geo-location may be identified. A rate of transmission may be prioritized for the first object based upon, at least in part, the estimated travel time of the user between the first geo-location and the second geo-location.

20 Claims, 6 Drawing Sheets

SYSTEM AND METHOD FOR PRIORITIZING DATA TRAFFIC

BACKGROUND

A mobile device user may use multiple computing device applications at any given time. For example, when traveling from point A to point B, work-related tasks, as well as personal-related tasks, may involve one or more of these applications downloading/uploading data (e.g., files or other objects). In some situations, a limited amount of bandwidth available to the user may affect the performance of these tasks.

BRIEF SUMMARY OF DISCLOSURE

In one example implementation, a method, performed by one or more computing devices, may include but is not limited to identifying, by a computing device, a first geo-location of a user. A first object may be identified, wherein the first object may be associated with a second geo-location. An estimated travel time of the user between the first geo-location and the second geo-location may be identified. A rate of transmission for the first object may be prioritized based upon, at least in part, the estimated travel time of the user between the first geo-location and the second geo-location.

One or more of the following example features may be included. A rate of transmission required to complete transmission of the first object during the estimated travel time may be identified. A rate of transmission for a second object may be adjusted based upon, at least in part, a rate of transmission to complete transmission of the first object by the estimated travel time. A change to the estimated travel time of the user between the first geo-location and the second geo-location may be identified. The rate of transmission for the first object may be adjusted based upon, at least in part, the change to the estimated travel time of the user between the first geo-location and the second geo-location. The rate of transmission may be adjusted based upon, at least in part, network idle time. The first object may be associated with the second geo-location using a map-based drag and drop user interface.

In another example implementation, a computing system may include one or more processors and one or more memories configured to perform operations that may include but are not limited to identifying a first geo-location of a user. A first object may be identified, wherein the first object may be associated with a second geo-location. An estimated travel time of the user between the first geo-location and the second geo-location may be identified. A rate of transmission for the first object may be prioritized based upon, at least in part, the estimated travel time of the user between the first geo-location and the second geo-location.

One or more of the following example features may be included. A rate of transmission required to complete transmission of the first object during the estimated travel time may be identified. A rate of transmission for a second object may be adjusted based upon, at least in part, a rate of transmission to complete transmission of the first object by the estimated travel time. A change to the estimated travel time of the user between the first geo-location and the second geo-location may be identified. The rate of transmission for the first object may be adjusted based upon, at least in part, the change to the estimated travel time of the user between the first geo-location and the second geo-location. The rate of transmission may be adjusted based upon, at least in part, network idle time. The first object may be associated with the second geo-location using a map-based drag and drop user interface.

In another example implementation, a computer program product may reside on a computer readable storage medium having a plurality of instructions stored thereon which, when executed across one or more processors, may cause at least a portion of the one or more processors to perform operations that may include but are not limited to identifying a first geo-location of a user. A first object may be identified, wherein the first object may be associated with a second geo-location. An estimated travel time of the user between the first geo-location and the second geo-location may be identified. A rate of transmission for the first object may be prioritized based upon, at least in part, the estimated travel time of the user between the first geo-location and the second geo-location.

One or more of the following example features may be included. A rate of transmission required to complete transmission of the first object during the estimated travel time may be identified. A rate of transmission for a second object may be adjusted based upon, at least in part, a rate of transmission to complete transmission of the first object by the estimated travel time. A change to the estimated travel time of the user between the first geo-location and the second geo-location may be identified. The rate of transmission for the first object may be adjusted based upon, at least in part, the change to the estimated travel time of the user between the first geo-location and the second geo-location. The rate of transmission may be adjusted based upon, at least in part, network idle time. The first object may be associated with the second geo-location using a map-based drag and drop user interface.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Generally, multiple computing device applications may be used at any given time by a mobile device user. For instance, when traveling between two points, both work related tasks, as well as personal related tasks, may involve one or more of these applications downloading/uploading data (e.g., files or other objects). Performance of these tasks may be affected by the limited amount of bandwidth available to the user. For instance, simultaneous downloading/uploading of data may clog the network (mobile or otherwise) and may affect the more important business applications.

To help address this example and non-limiting problem, a user may, e.g., manually rate limit how much data may be consumed, manually pause/un-pause a particular download/upload when the use of other applications are desired, and may manually set aside/schedule a time when the user wants to download/upload a file. However, even with these techniques, there is no guarantee that the file will be downloaded/uploaded by the time the file is needed.

As will be discussed in greater detail below, the priority process of the present disclosure may be integrated into the practical application of advantageously prioritizing parallel connections and/or data traffic using the current geo-location of the user, as well as the destination of the user. As such, the priority process may help overcome an example and non-limiting problem specifically arising in the realm of computer networks. It will be appreciated that the computer processes described throughout are integrated into one or more practical applications, and when taken at least as a whole are not considered to be well-understood, routine, and conventional functions.

Figure 1A:
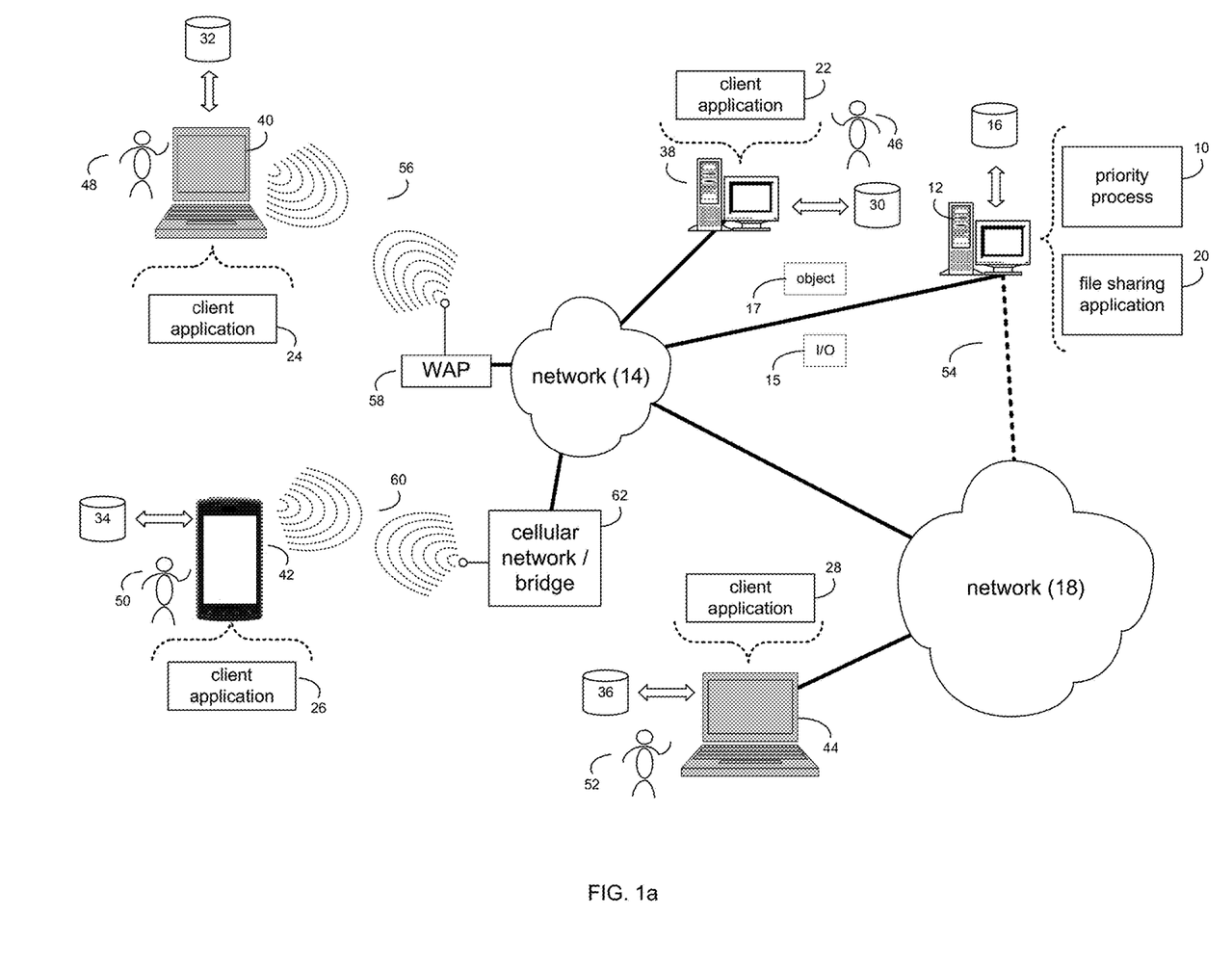
FIG. 1a is an example diagrammatic view of a priority process coupled to an example distributed computing network according to one or more example implementations of the disclosure.

Referring now to the example implementation of FIG. 1a, there is shown priority process 10 that may reside on and may be executed by a computer (e.g., computer 12), which may be connected to a network (e.g., network 14) (e.g., the internet or a local area network). In some implementations, as will be discussed below in greater detail, the priority process 10 may receive, by a computing device 12, a plurality of file segments of a file, the plurality of file segments being received individually by the computing device. A first file segment of the file may be scanned to identify the presence of malware within that file segment. The first file segment of the file may be encrypted to create an encrypted file segment in response to identification by the scan of the first file segment that malware is absent from the first file segment. The encrypted file segment of the file may be sent to another computing device before a second file segment of the file is received by the computing device. Thus, the processes of the present disclosure provide an improvement in electronic transfer of digital information and communications data by increasing the speed of data transfers (e.g., sharing a file) between computing devices without adversely affecting the security of the computing device in receipt of the data.

In some implementations, the instruction sets and subroutines of priority process 10, which may be stored on storage device, such as storage device 16, coupled to computer 12, may be executed by one or more processors and one or more memory architectures included within computer 12. In some implementations, priority process 10 may be a component of a data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, priority process 10 and/or file sharing application 20 may be accessed via one or more of client applications 22, 24, 26, 28 to facilitate the transfer of data and/or information among computer 12 and client electronic devices 38, 40, 42, and 44. Client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), and a notebook computer (e.g., client electronic device 44).

In some implementations, computer 12 may execute a file sharing application (e.g., file sharing application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for file sharing. An example of file sharing application 20 may include, but is not limited to, e.g., ShareFile® by Citrix Systems, Inc. of Ft. Lauderdale, Fla.

In some implementations, priority process 10 may be a standalone application, or may be an applet/application/script/extension that may interact with and/or be executed within file sharing application 20, a component of file sharing application 20, and/or one or more of client applications 22, 24, 26, 28. In some implementations, file sharing application 20 may be a standalone application, or may be an applet/application/script/extension that may interact with and/or be executed within priority process 10, a component of priority process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of priority process 10 and/or file sharing application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for file sharing, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of client applications 22, 24, 26, 28 may be configured to effectuate some or all of the functionality of priority process 10 (and vice versa). Accordingly, in some implementations, priority process 10 may be a purely server-side application, a purely client-side application, or a hybrid server-side/client-side application that is cooperatively executed by one or more of client applications 22, 24, 26, 28 and/or priority process 10.

In some implementations, one or more of client applications 22, 24, 26, 28 may be configured to effectuate some or all of the functionality of file sharing application 20 (and vice versa). Accordingly, in some implementations, file sharing application 20 may be a purely server-side application, a purely client-side application, or a hybrid server-side/client-side application that is cooperatively executed by one or more of client applications 22, 24, 26, 28 and/or file sharing application 20. As one or more of client applications 22, 24, 26, 28, priority process 10, and file sharing application 20, taken singly or in any combination, may effectuate some or all of the same functionality, any description of effectuating such functionality via one or more of client applications 22, 24, 26, 28, priority process 10, file sharing application 20, or combination thereof, and any described interaction(s) between one or more of client applications 22, 24, 26, 28, priority process 10, file sharing application 20, or combination thereof to effectuate such functionality, should be taken as an example only and not to limit the scope of the disclosure.

In some implementations, one or more of users 46, 48, 50, 52 may access computer 12 and priority process 10 (e.g., using one or more of client electronic devices 38, 40, 42, 44) directly through network 14 or through secondary network 18. Further, computer 12 may be connected to network 14 through secondary network 18, as illustrated with phantom link line 54. Priority process 10 may include one or more user interfaces, such as browsers and textual or graphical user interfaces, through which users 46, 48, 50, 52 may access priority process 10.

In some implementations, various I/O requests (e.g., I/O request 15) may be sent from, e.g., client applications 22, 24, 26, 28 to, e.g., computer 12 (and vice versa). Examples of I/O request 15 may include but are not limited to, data write requests (e.g., a request that content be written to computer 12) and data read requests (e.g., a request that content be read from computer 12).

Figure 1B:
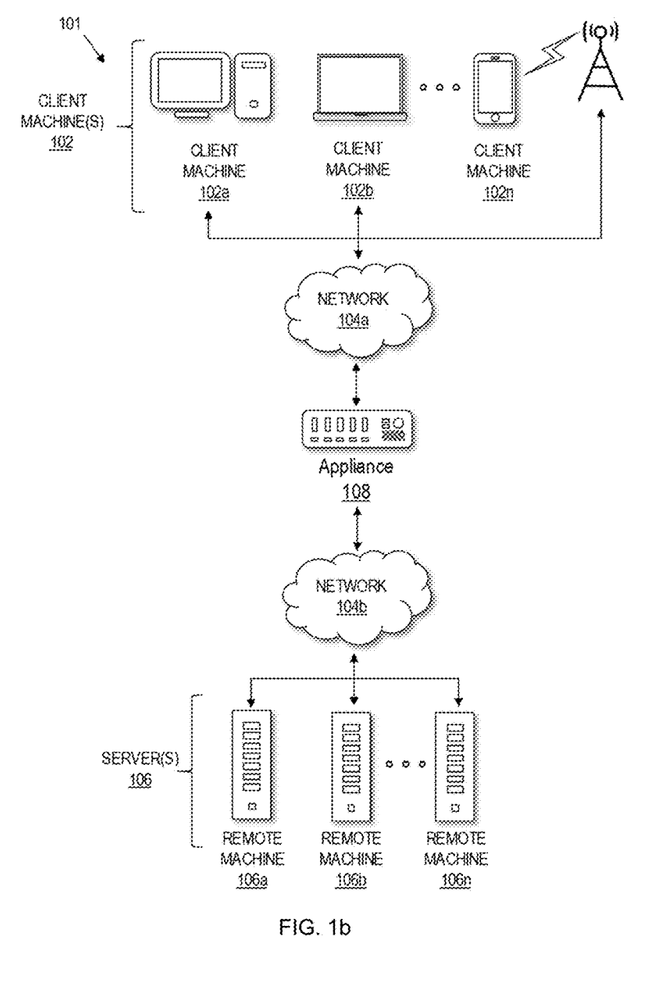
FIG. 1b is an example diagrammatic view of an alternative network environment according to one or more example implementations of the disclosure.

Referring now to the example implementation of FIG. 1b, another non-limiting network environment 101 is shown in which various aspects of the present disclosure may be implemented, which may include one or more client machines 102A-102N (which in some implementations may include as the above-noted client electronic devices), one or more remote machines 106A-106N (which in some implementations may include the above-noted computer 12), one or more networks 104a, 104b (which in some implementations may include the above-noted networks 14 and 18), and one or more appliances 108 installed within computing environment 101. Client machines 102A-102N may communicate with remote machines 106A-106N (and vice versa) via networks 104a, 104b.

Examples of client machines 102A-102N (and/or one or more of the computing devices described above) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a Redundant Array of Independent Disks (RAID) device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. The computing devices may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, client machines 102A-102N can include storage devices (e.g., storage device 16) such as: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof. In some implementations, client machines 102A-102N (e.g., computer 12 of FIG. 1a) may include a data store, such as a database (e.g., relational database, object-oriented database, triplestore database, etc.) and may be located within any suitable memory location (e.g., storage device 16 coupled to computer 12 of FIG. 1a).

In some implementations, client machines 102A-102N may be communicatively coupled to data stores (e.g., 16 of FIG. 1a) so that data, metadata, information, etc. described throughout the present disclosure may be stored. In some implementations, client machines 102A-102N may utilize any known database management system (e.g., 16 of FIG. 1a) in order to provide multi-user access to one or more databases, such as the above noted relational database. In some implementations, the data store may also be a custom database, such as, for example, a flat file database or an XML database. In some implementations, any other form(s) of a data storage structure and/or organization may also be used.

In some implementations, storage devices (e.g., 30, 32, 34, and 36 of FIG. 1a) can be communicatively coupled to the client machines 102A-102N to store data, metadata, or other information to facilities operation of the system. The storage devices may include but are not limited to: hard disk drives; flash drives, tape drives; optical drives; RAID arrays; random access memories (RAM); and read-only memories (ROM). Examples of client electronic devices a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. In some implementations, client machines 102A-102N may communicate with remote machines 106A-106N via intermediary appliance 108. Appliance 108 may be positioned between networks 104a, 104b and may also be referred to as a network interface or gateway. In some implementations, appliance 108 may operate as an application delivery controller (ADC) to provide clients with access to business applications and other data deployed in a datacenter, a cloud environment, or delivered as Software as a Service (SaaS) across a range of client machines, and/or provide other functionality such as load balancing, etc. In some implementations, multiple appliances 108 may be used, and appliance(s) 108 may be deployed as part of network 104a and/or 104b.

In some implementations, the various client machines 102A-102N (e.g., client electronic devices of FIG. 1a) may be directly or indirectly coupled to a network (e.g., networks 14 or 18 of FIG. 1a or networks 104a or 104b of FIG. 1b). For example, client machines 102A-102N are shown directly coupled to network 104A via a network connection (e.g., a wireless or a hardwired network connection). Further, in some examples, a wireless communication connection can include a wireless access point (e.g., WAP 58 of FIG. 1a). The wireless access point may be, for example, an IEEE 802.11a, 802.11b, 802.11g, 802.11n, 802.11ac, Wi-Fi®, RFID, and/or Bluetooth™ (e.g., 802.15) (including Bluetooth™ Low Energy) device that is capable of establishing wireless communication channel (e.g., communications channel 56 between client electronic device 40 and WAP 58 shown in FIG. 1a). In some examples, client machines 102A-102N (e.g., client electronic device 42 of FIG. 1a) can be wirelessly coupled to a network via wireless communication channel (e.g., channel 60 shown in FIG. 1a) using cellular network/bridge (e.g., bridge 62 of FIG. 1a).

In some implementations, network 104a and 104b may be connected to one or more secondary networks (e.g., network 18 of FIG. 1a), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used. Client machines 102A-102N may be generally referred to as local machines, clients, client nodes, client computers, client devices, client electronic devices, computing devices, endpoints, or endpoint nodes, but herein are referred to as client machines 102. Examples of client machines 102A-102N include a tablet, a server, a television, a smart speaker, an Internet of Things (IoT) device, a media (e.g., audio/video, photo, etc.) capturing and/or output device, an audio input and/or recording device (e.g., a microphone), or any other network device. Client machines 102A-102N may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

Remote machines 106A-106N may be generally referred to as servers or a server farm, and herein are referred to as server 106. In some implementations, client device 102 may have the capacity to function as both a client node seeking access to resources provided by servers 106 and as server 106 providing access to hosted resources for other client devices 102A-102N. Networks 104a, 104b may be generally referred to as network 104. Network 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some implementations, server 106 may execute a remote presentation services program or other program that uses a thin-client or a remote-display protocol to capture display output generated by an application executing on server 106 and transmit the application display output to client device 102.

In yet other implementations, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some implementations, network 104 may be: a local-area network (LAN); a metropolitan area network (MAN); a wide area network (WAN); a primary public network 104; and a primary private network 104. Additional implementations may include a network 104 of mobile telephone networks that use various protocols to communicate among mobile devices. For short range communications within a wireless local-area network (WLAN), the protocols may include 802.11, Bluetooth™, and Near Field Communication (NFC).

Figure 2:
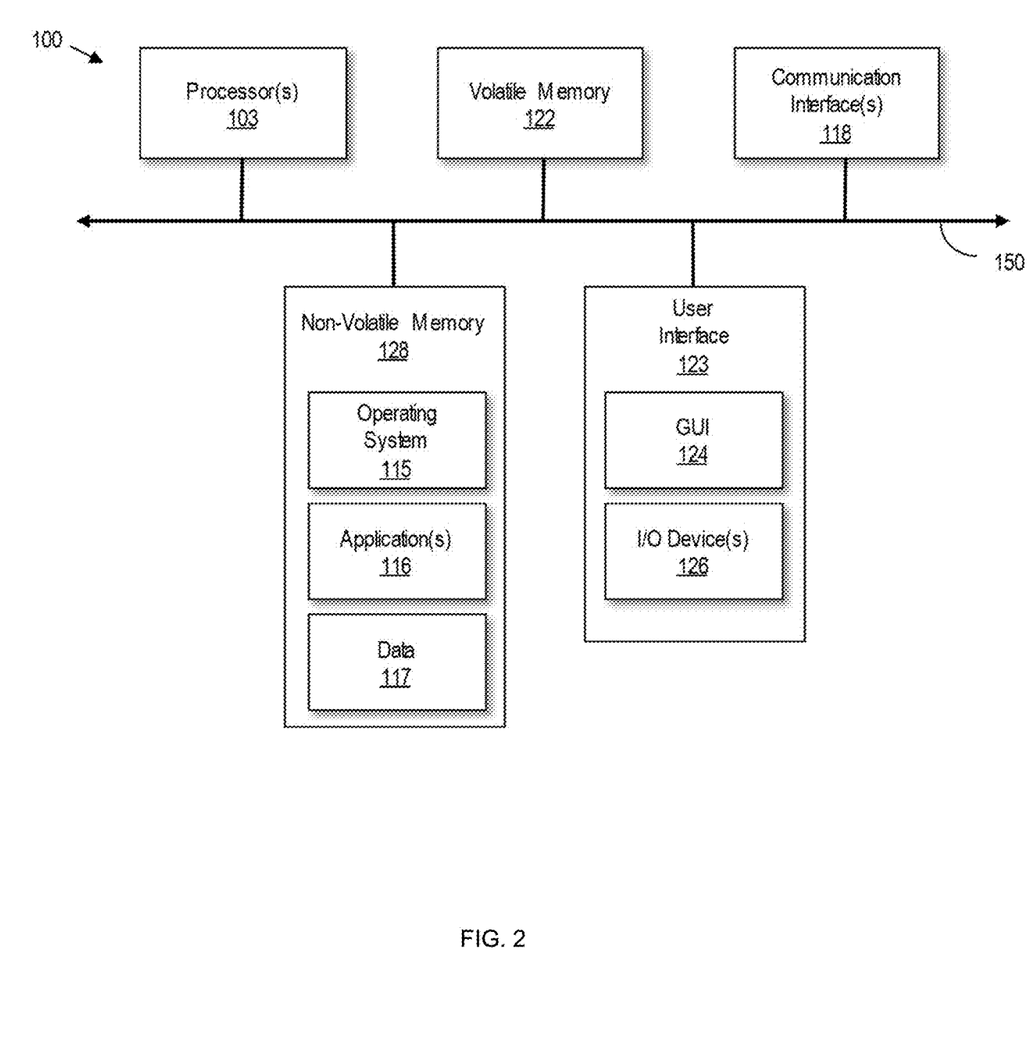
FIG. 2 is an example diagrammatic view of a computing device of FIG. 1 according to one or more example implementations of the disclosure.

Referring also to the example implementation of FIG. 2, there is shown a block diagram of computing device 100 that may be useful for practicing an implementation of client devices 102, appliances 108 and/or servers 106. Computing device 100 may include one or more processors 103, volatile memory 122 (e.g., random access memory (RAM)), non-volatile memory 128, user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

UI 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 may store operating system 115, one or more applications 116, and data 117 such that, for example, computer instructions of operating system 115 and/or applications 116 are executed by processor(s) 103 out of volatile memory 122. In some implementations, volatile memory 122 may include one or more types of RAM and/or a cache memory that may offer a faster response time than a main memory. Data may be entered using an input device of GUI 124 or received from I/O device(s) 126. Various elements of computer 100 may communicate via communications bus 150.

Computing device 100 is shown merely as an example client device or server, and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" may describe circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some implementations, the processor may be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some implementations, processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described implementations, computing device 100 may execute an application (e.g., the above-noted client application) on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
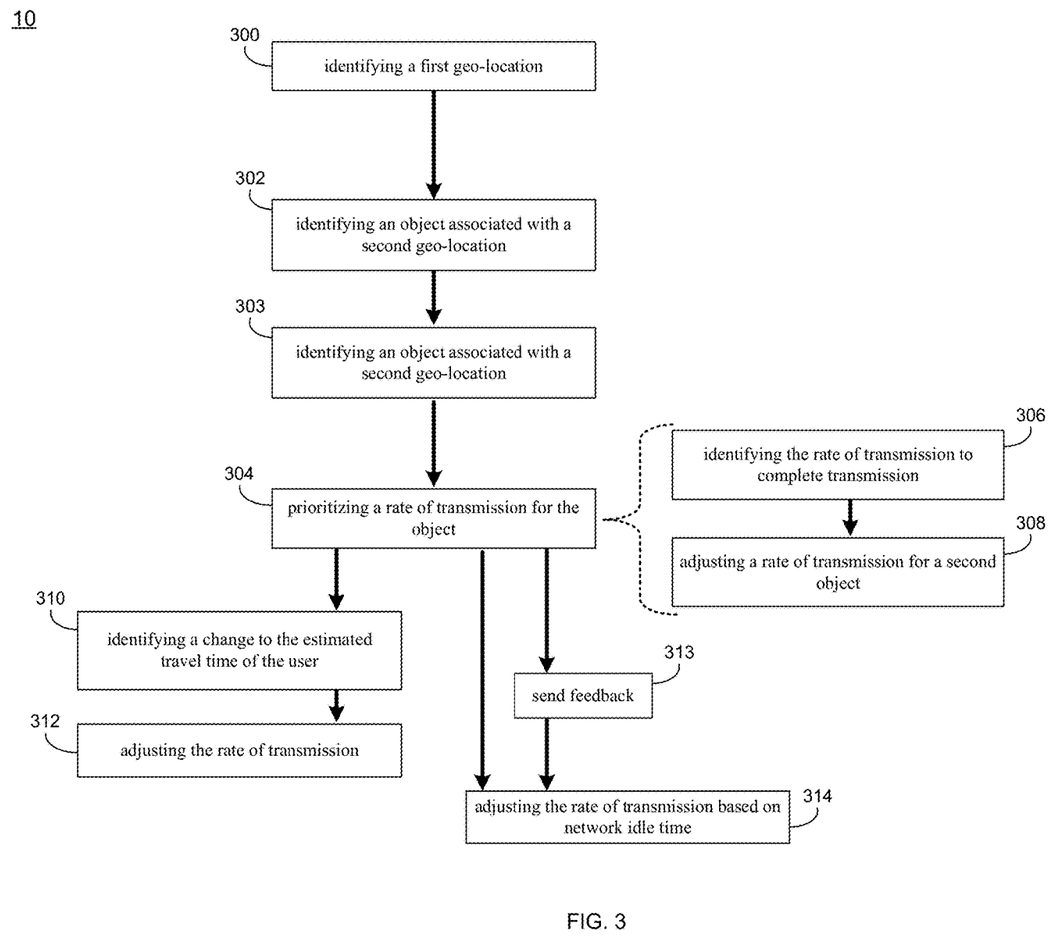
FIG. 3 is an example flowchart of a priority process according to one or more example implementations of the disclosure.
Figure 4:
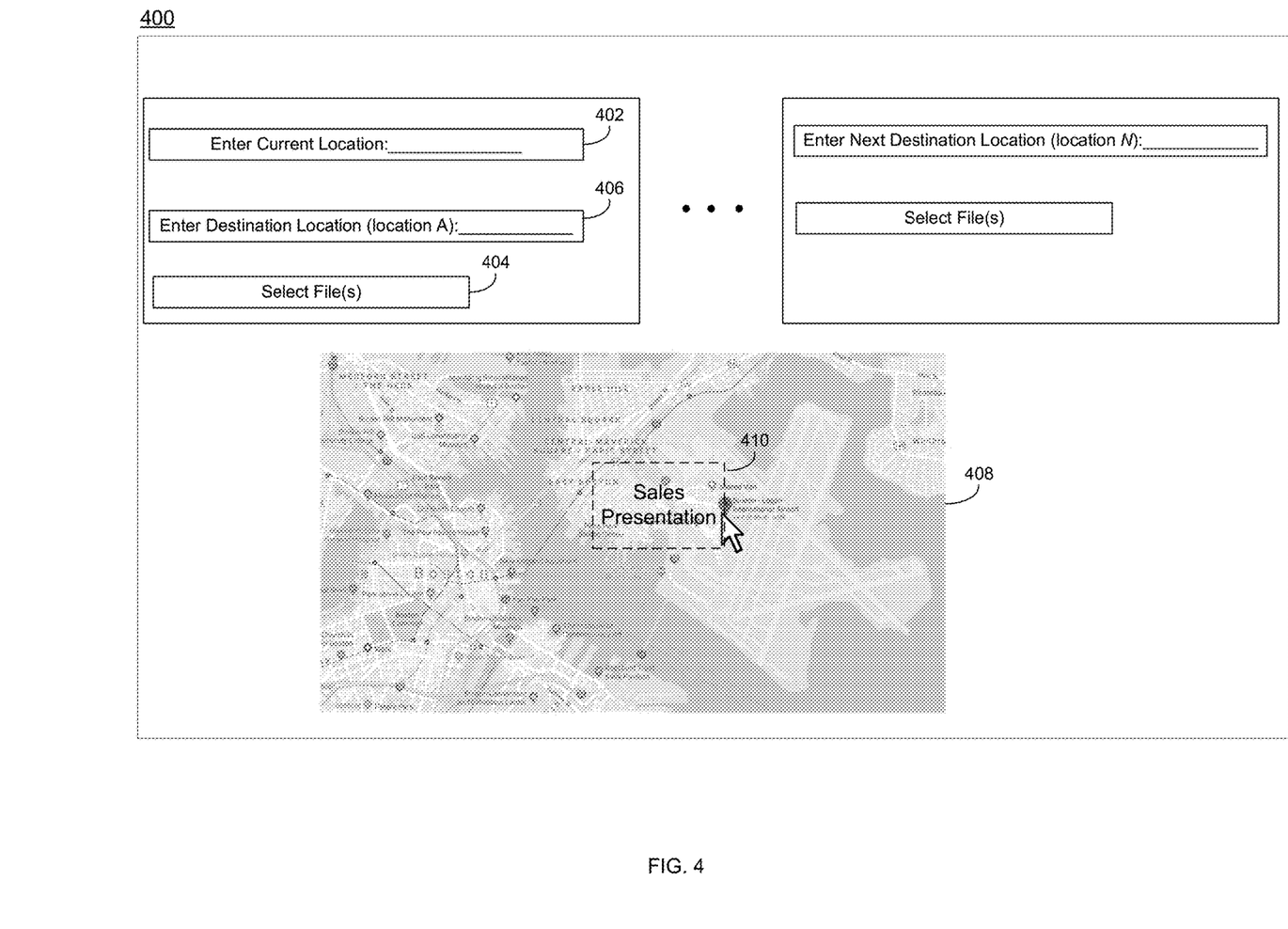
FIG. 4 is an example diagrammatic view of a user interface displayed by a priority process according to one or more example implementations of the disclosure.
Figure 5:
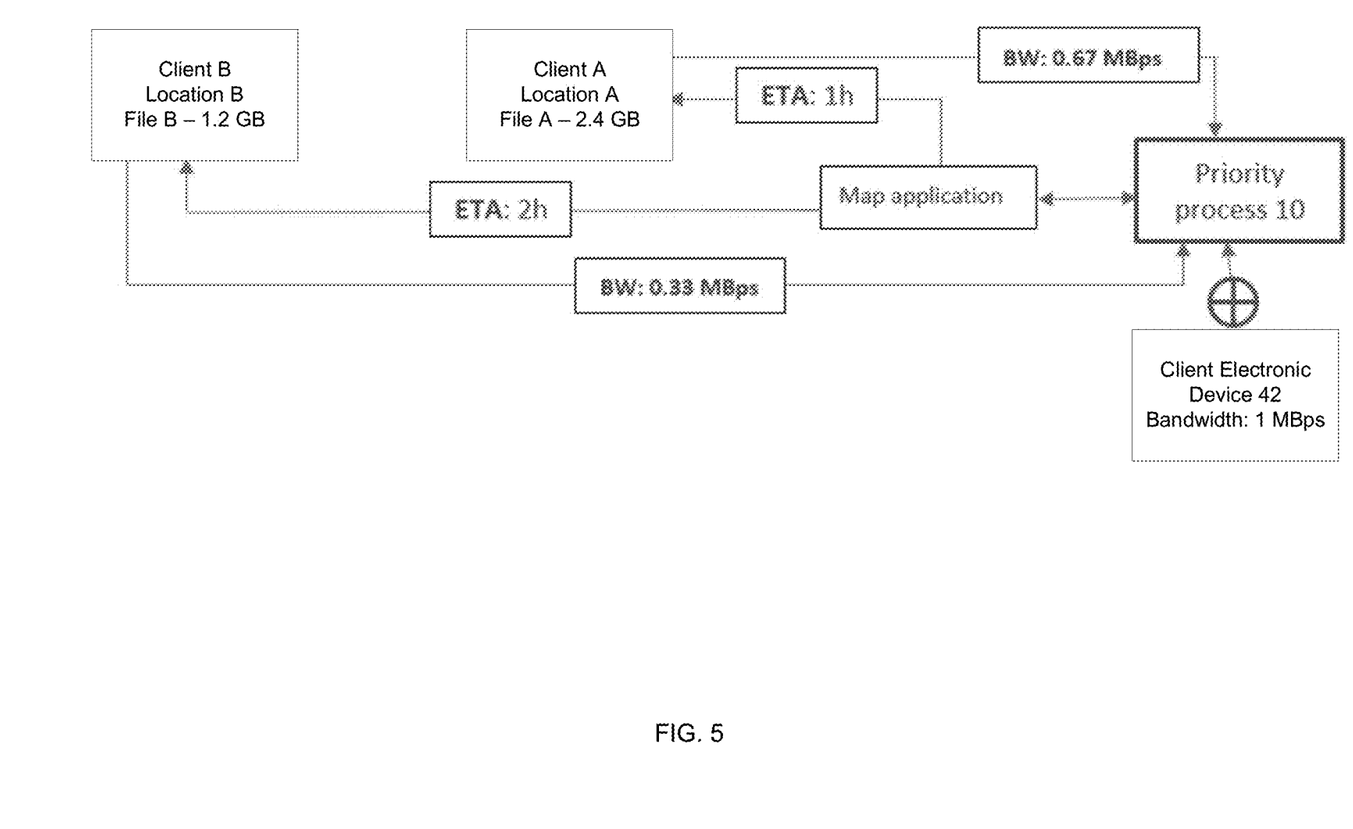
FIG. 5 is an example diagrammatic view of bandwidth allocation of a priority process according to one or more example implementations of the disclosure.

As discussed above and referring also at least to the example implementations of FIGS. 3-5, at block 300, priority process 10 may identify a first geo-location of a user of a computing device (e.g., client device 42 of FIG. 1a). At block 302, priority process 10 may identify a first object (e.g., object 17 of FIG. 1a) associated with a second geo-location. At block 303, priority process 10 may identify an estimated travel time of the user between the first geo-location and the second geo-location. At block 304, priority process 10 may prioritize a rate of transmission for the first object based upon, at least in part, the estimated travel time of the user between the first geo-location and the second geo-location.

For instance, assume for example purposes only that a user (e.g., user 50 from FIG. 1a) has a meeting with a client later in the day. Further assume that user 50 is at work (e.g., current location) and has a remotely stored copy of a sales presentation (e.g., at a data store operatively connected to computer 12), which user 50 plans to show to a prospective client (e.g., by streaming the sales presentation to a smart TV via client electronic device 42 of FIG. 1a). In the example, further assume that user 50 needs to have the sales presentation downloaded to client electronic device 42 at least by the time user 50 arrives at the prospective client's place of business (e.g., location A) so that the sales presentation may begin on time.

In some implementations, at block 300, priority process 10 may identify a first geo-location of a user. For example, client electronic device 42 of user 50 may (e.g., via priority process 10) include Global Positioning System (GPS) functionality that may determine and identify 300 the current geo-location of user 50 (e.g., at work). In some implementations, priority process 10 may identify the geo-location of user 50 by receiving (e.g., at computer 12 of FIG. 1a) the geo-location of user 50 determined by client electronic device 42. It will be appreciated that other techniques of identifying the geo-location of user 50 (e.g., based on the known location of or triangulation of cell phone towers or WiFi access points in communication with client electronic device 42, etc.) may also be used without departing from the scope of the disclosure. As such, the use of GPS should be taken as example only and not to otherwise limit the scope of the disclosure.

In some implementations, priority process 10 may identify the geo-location of user 50 from a manual input received by user 50. For instance, and referring at least to the example implementation of FIG. 4, an example user interface (e.g., UI 400) displayed on the client electronic device 42 and associated with priority process 10 is shown. In the example, user 50 may use UI 400 (e.g., via client electronic device 42 of FIG. 1a) to enter their current location, which may be received and identified by priority process 10. For instance, user 50 may select a UI element (e.g., UI element 402) that enables the manual entering of the current location of user 50 using any known technique (e.g., keyboard, touch screen, etc.).

While a particular example design of UI 400 is shown, it will be appreciated that various other designs, including more, less, and differing functionality, may be used without departing from the scope of the disclosure. As such, the particular example design of UI 400 should be taken as example only and not to otherwise limit the scope of the disclosure.

In some implementations, at block 302, priority process 10 may identify a first object (e.g., object 17 from FIG. 1a), wherein object 17 may be associated with a second geo-location. For instance, and continuing with the example implementation of FIG. 4, user 50 may use UI 400 (e.g., via client electronic device 42) to select a particular object (e.g., the sales presentation file), where the selection of the sales presentation file may be received and identified 302 by priority process 10. For instance, user 50 may select a UI element (e.g., UI element 404) that enables the manual selection of the sales presentation file needed to be downloaded (e.g., from the above-noted remote storage) to client electronic device 42 using any known technique (e.g., browsing, drag and drop, etc.). While the present disclosure is described in terms of a file, it will be appreciated that any type of object (e.g., data, metadata, etc.) may be used without departing from the scope of the present disclosure. Examples of object 17 may further include, e.g., an application, a virtual desktop session, streaming audio/video, or any other object capable of being transmitted. As such, the description of a file should be taken as example only and not to otherwise limit the scope of the present disclosure.

As noted above, in some implementations, priority process 10 may associate object 17 (e.g., the sales presentation file) with the second geo-location. For instance, and continuing with the example implementation of FIG. 4, user 50 may use UI 400 (e.g., via client electronic device 42 of FIG. 1a) to enter the second geo-location (e.g., destination location of the perspective client also referred to as location A), which may be received and identified by priority process 10. For instance, user 50 may select a UI element (e.g., UI element 406) that enables the manual entering of location A by user 50 using any known technique (e.g., keyboard, touch screen, etc.). As such, in the example, priority process 10 (e.g., via UI 400) may enable user 50 to set the physical geo-location (destination) of where the sales presentation file is to be used (e.g., viewed, accessed, etc.), which in the example may denote the user's need/desire for the sales presentation file to be downloaded to client electronic device 42 (or other client electronic device) by the time user 50 arrives at location A (e.g., location of the perspective client).

It will be appreciated that priority process 10 may associate object 17 (e.g., the sales presentation file) with the second geo-location using more than one technique. For example, in some implementations, object 17 may be associated with the second geo-location using a map-based drag and drop user interface. For instance, and continuing with the example implementation of FIG. 4, UI 400 may include a map (e.g., map 408). In the example, UI 400 may enable user 50 to associate object 17 (e.g., the sales presentation file) with the second geo-location (e.g., location A) by having user 50 "drag and drop" the sales presentation file on a particular location/region on map 408. For instance, in the example, by having user 50 drag and drop the sales presentation file (e.g., icon 410 representing the stored sales presentation file) on a location of map 408, priority process 10 may associate the sales presentation file with that location (e.g., location A), which in the example may denote the user's need/desire for the sales presentation file to be downloaded to client electronic device 42 (or other client electronic device) by the time user 50 arrives at location A. As such, the use of any particular technique of associating the example sales presentation file with a particular location should be taken as example only and not to otherwise limit the scope of the disclosure.

In some implementations, at block 303, priority process 10 may identify an estimated travel time of the user (e.g., user 50 from FIG. 1a) between the first geo-location and the second geo-location. For example, priority process 10 may include (or have access to) a mapping application (e.g., web mapping service) that may be used to determine and/or identify an estimate of how long it will take user 50 to travel from the current location of user 50 (e.g., first geo-location, current location, or work in the above example) to the destination (e.g., second geo-location or location A of the perspective client in the above example). In some implementations, the estimated travel time may take into account such things as, e.g., distance between the current location and location A, traffic, time of day when traveling between the current location and location A is to occur, etc.

In some implementations, at block 304, priority process 10 may prioritize a rate of transmission for object 17 based upon, at least in part, an estimated travel time of the user between the first geo-location and the second geo-location. For example, at block 304, and continuing with the above example, priority process 10 may prioritize the rate of transmission (e.g., downloading/uploading) the sales presentation file (e.g., from the above-noted remote storage to client electronic device 42). In some implementations, this may include priority process 10 altering the download/upload rates of some or all connections and files (even those not affected by locational use) based upon, at least in part, the estimated time of arrival. For instance, as will be discussed below, priority process 10 may allocate more bandwidth for downloading (or uploading) the sales presentation file (e.g., while traveling between the current location and location A) than the bandwidth allocated to downloading (or uploading) other files (or objects). In some implementations, this may help ensure that the sales presentation is downloaded to (or in some implementations uploaded from) client electronic device 42 by the time it is needed (e.g., when user 50 arrives at location A of the perspective client).

In some implementations, prioritizing the rate of transmission at block 304 may include identifying the rate of transmission required to complete transmission of object 17 by the estimated travel time at optional block 306. For instance, at optional block 306, based on the size of the sales presentation file and the estimated travel time, priority process 10 may determine and/or identify the rate of transmission that may be required for the sales presentation to be downloaded to client electronic device 42 by the time user 50 arrives at the location of the perspective client (location A). For example, and referring at least to the example implementation of FIG. 5, assume that user 50 (e.g., via client electronic device 42) is downloading, e.g., two files, with a total bandwidth connection of 1 MBps available to client electronic device 42. In the example, one file (e.g., file A also referred to as object 17) may be the sales presentation file to show the perspective client (e.g., client A at location A), and the second file (e.g., file B) may be a marketing presentation file to show a different perspective client later in the day at another location (e.g., client B at location B). Further assume in the example that the estimated travel time to location A is identified as being one hour. In such an example scenario, user 50 may be able to download 3.6 GB of total data in one hour. Typically (e.g., without priority process 10), the bandwidth is generally split equally between the two files (0.5 MBps each). Thus, in the example, at the end of one hour, user 50 may have only 1.8 GB of file A and 1.8 GB of file B, resulting in user 50 not having the entire sales presentation file (file A) downloaded upon arrival when needed. However, given the size of file A (e.g., 2.4 GB) and the estimated one hour travel time to the perspective client (at location A), and given the size of file B (e.g., 1.2 GB) and the estimated two hour travel time to the perspective client (at location B), priority process 10 may identify that the rate of transmission required to fully download file A by the time user 50 arrives at location A is 0.67 MBps, and/or may identify that the rate of transmission required to fully download file B by the time user 50 arrives at location B is 0.33 MBps.

In some implementations, at optional block 308, priority process 10 may adjust a rate of transmission for a second object based upon, at least in part, the rate of transmission required to complete transmission of object 17 during the estimated travel time. For instance, and continuing with the above example, since, at optional block 306, priority process 10 has identified that the rate of transmission required to fully download object 17 (file A) by the time user 50 arrives at location A is 0.67 MBps, priority process 10 may adjust 308 (e.g., limit) the rate of transmission for the second object (file B) to 0.33 MBps, allowing for the adjustment of the rate of transmission for file A to be increased to 0.67 MBps (e.g., the above-noted identified rate of transmission required to fully download file A by the time user 50 arrives at location A). Therefore, in the example, priority process 10 may use the estimated travel time and file size of file A to prioritize and/or schedule the downloading (or uploading) of the two files such both file A and file B may be downloaded in parallel (or separately depending on the required rate of transmission), but having file A completely downloaded first, since user 50 first needs to show file A to the perspective client at location A.

In some implementations, at block 310, priority process 10 may identify a change to the estimated travel time of the user between the first geo-location and the second geo-location, and in some implementations, at block 312, priority process 10 may adjust the rate of transmission for object 17 based upon, at least in part, the change to the estimated travel time of the user between the first geo-location and the second geo-location. For instance, priority process 10 may periodically (e.g., at minute intervals) identify the required rate of transmission at block 306. For example, user 50 may not be moving towards location A at a steady rate. For instance, if during the course of travel, priority process 10 identifies at block 310 that the estimated travel time has increased (e.g., due to increased traffic, an accident, or user 50 taking a different longer route, etc.), less bandwidth may be required to download file A by the time user 50 reaches location A. As such, in some implementations, priority process 10 may adjust, at block 312, (e.g., decrease) the bandwidth allocated to file A (e.g., by −0.07 MBps), and adjust the bandwidth allocated to file B (e.g., by +0.07 MBps) to allow file B to be downloaded in parallel (or downloaded faster in parallel) with file A, still ensuring that file A will be downloaded by the time user 50 reaches location A. Conversely, if during the course of travel, priority process 10 identifies at block 310 that the estimated travel time has decreased (e.g., due to less traffic or user 50 taking a different shorter route, etc.), more bandwidth may be required to download file A by the time user 50 reaches location A. As such, in some implementations, priority process 10 may adjust at block 312 (e.g., increase) the bandwidth allocated to file A (e.g., by +0.07 MBps), and adjust the bandwidth allocated to file B (e.g., by −0.07 MBps) to potentially still allow file B to be downloaded in parallel with file A (or pausing the downloading of file B altogether if necessary), still ensuring that file A will be downloaded by the time user 50 reaches location A. In some implementations, should there be enough available bandwidth to ensure that file A will be downloaded by the time user 50 reaches location A (with or without a change to the estimated travel time), priority process 10 may distribute some or all of the excess bandwidth to download file B (or any other files needed to be downloaded/uploaded from any other client applications).

In some implementations, at block 314, priority process 10 may adjust the rate of transmission based upon, at least in part, network idle time. For instance, priority process 10 may periodically (e.g., at minute intervals) identify the above-noted required rate of transmission at block 306. For example, priority process 10 may include (or have access to) a network monitoring application (e.g., of client electronic device 42 of FIG. 1*a*) to determine whether there is any network idle time (e.g., little or no bandwidth being used). In some implementations, if priority process 10 determines that client electronic device 42 is idle, priority process 10 may, at optional block 313, send feedback (e.g., to file sharing application 20) indicating that bandwidth to transmit file A may be adjusted at block 314 to its maximum bandwidth. In some implementations, if priority process 10 determines that client electronic device 42 is no longer idle (e.g., due to the bandwidth use of other client applications on client electronic device 42), priority process 10 may, at optional block 313, send feedback (e.g., to file sharing application 20) to adjust the bandwidth to transmit file A according to the prioritized rate of transmission at block 314. It will be appreciated that should the remaining size of file A be reduced faster due to the maximum bandwidth adjustment during idle time, an updated rate of transmission may be identified at block 306.

While the present disclosure is described as associating a single file with a single location, in some implementations, priority process 10 may similarly associate multiple files with a single location, each with their own prioritized rate of transmission, without departing from the scope of the disclosure. In some implementations, priority process 10 may similarly associate multiple files with multiple destinations, each with their own prioritized rate of transmission, without departing from the scope of the disclosure. As such, the description of associating a single file with a single location should be taken as example only and not to otherwise limit the scope of the present disclosure.

In some implementations, priority process 10 may include a default setting, where the majority of bandwidth may be allocated based upon which destination (e.g., location A or location B) is closest to the current location of user 50. For instance, assume for example purposes only that user 50 passes location B while traveling to location A (where access to file A is needed). In the example, priority process 10 may initially prioritize the rate of transmission for file B instead of file A, believing that the first location that user 50 is traveling to (location B) is the closest location to the current location of user 50, whereas user 50 may have actually planned to have the first destination be location A (as in the above example). In some implementations, to help address this potential scenario, UI 400 (from FIG. 4) may enable user 50 to specify the chronological order of the target locations to be visited by user 50. In some implementations, the order in which user 50 drags and drops the selected files onto map 408 may specify the chronological order of the destinations.

While the present disclosure is described in terms of transmission being the downloading of a file, it will be appreciated that the present disclosure may similarly be used for uploading a file (e.g., to computer 12 or other client electronic devices) without departing from the scope of the present disclosure. As such, the description of downloading a file should be taken as example only and not to otherwise limit the scope of the present disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code or machine code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
identifying, by a computing device, a first geo-location of a user;
identifying a first object, wherein the first object is associated with a second geo-location;
identifying an estimated travel time of the user between the first geo-location and the second geo-location; and
prioritizing a rate of transmission for the first object based upon, at least in part, the estimated travel time of the user between the first geo-location and the second geo-location.

2. The computer-implemented method of claim 1 comprising identifying a rate of transmission to complete transmission of the first object during the estimated travel time.

3. The computer-implemented method of claim 2 comprising adjusting a rate of transmission for a second object based upon, at least in part, a rate of transmission to complete transmission of the first object during the estimated travel time.

4. The computer-implemented method of claim 1 comprising identifying a change to the estimated travel time of the user between the first geo-location and the second geo-location.

5. The computer-implemented method of claim 4 comprising adjusting the rate of transmission for the first object based upon, at least in part, the change to the estimated travel time of the user between the first geo-location and the second geo-location.

6. The computer-implemented method of claim 1 comprising adjusting the rate of transmission based upon, at least in part, network idle time.

7. The computer-implemented method of claim 1 wherein the first object is associated with the second geo-location using a map-based drag and drop user interface.

8. A computer program product residing on a non-transitory computer readable storage medium having a plurality of instructions stored thereon which, when executed by one or more processors, causes the one or more processors to perform operations comprising:
identifying a first geo-location of a user;
identifying a first object, wherein the first object is associated with a second geo-location;
identifying an estimated travel time of the user between the first geo-location and the second geo-location; and
prioritizing a rate of transmission for the first object based upon, at least in part, the estimated travel time of the user between the first geo-location and the second geo-location.

9. The computer program product of claim 8 wherein the operations further comprise identifying a rate of transmission to complete transmission of the first object during the estimated travel time.

10. The computer program product of claim 9 wherein the operations further comprise adjusting a rate of transmission for a second object based upon, at least in part, a rate of transmission to complete transmission of the first object during the estimated travel time.

11. The computer program product of claim 8 wherein the operations further comprise identifying a change to the estimated travel time of the user between the first geo-location and the second geo-location.

12. The computer program product of claim 11 wherein the operations further comprise adjusting the rate of transmission for the first object based upon, at least in part, the change to the estimated travel time of the user between the first geo-location and the second geo-location.

13. The computer program product of claim 8 wherein the operations further comprise adjusting the rate of transmission based upon, at least in part, network idle time.

14. The computer program product of claim 8 wherein the first object is associated with the second geo-location using a map-based drag and drop user interface.

15. A computing system comprising:
a memory; and
at least one processor in communication with the memory, the at least one processor configured to:
- identify a first geo-location of a user;
- identify a first object, wherein the first object is associated with a second geo-location;
- identify an estimated travel time of the user between the first geo-location and the second geo-location; and
- prioritize a rate of transmission for the first object based upon, at least in part, the estimated travel time of the user between the first geo-location and the second geo-location, wherein prioritizing the rate of transmission includes identifying a rate of transmission to complete transmission of the first object during the estimated travel time.

16. The computing system of claim 15 wherein the at least one processor is further configured to adjust a rate of transmission for a second object based upon, at least in part, a rate of transmission to complete transmission of the first object during the estimated travel time.

17. The computing system of claim 15 wherein the at least one processor is further configured to identify a change to the estimated travel time of the user between the first geo-location and the second geo-location.

18. The computing system of claim 17 wherein the at least one processor is further configured to adjust the rate of transmission for the first object based upon, at least in part, the change to the estimated travel time of the user between the first geo-location and the second geo-location.

19. The computing system of claim 15 wherein the at least one processor is further configured to adjust the rate of transmission based upon, at least in part, network idle time.

20. The computing system of claim 15 wherein the first object is associated with the second geo-location using a map-based drag and drop user interface.

* * * * *